United States Patent
Bertocchi

(10) Patent No.: US 9,918,490 B2
(45) Date of Patent: Mar. 20, 2018

(54) PLANT FOR COLD EXTRACTION OF PUREE OR JUICE FROM FOOD OF VEGETABLE ORIGIN

(71) Applicant: Alessandro Bertocchi, Parma (IT)

(72) Inventor: Alessandro Bertocchi, Parma (IT)

( * ) Notice: Subject to any disclaimer, the term of this patent is extended or adjusted under 35 U.S.C. 154(b) by 167 days.

(21) Appl. No.: 14/371,809

(22) PCT Filed: Jan. 8, 2013

(86) PCT No.: PCT/IB2013/050148
§ 371 (c)(1),
(2) Date: Jul. 11, 2014

(87) PCT Pub. No.: WO2013/105016
PCT Pub. Date: Jul. 18, 2013

(65) Prior Publication Data
US 2014/0363556 A1 Dec. 11, 2014

(30) Foreign Application Priority Data

Jan. 13, 2012 (IT) .............................. PI2012A0004

(51) Int. Cl.
*A23N 1/02* (2006.01)
*A23L 1/212* (2006.01)
(Continued)

(52) U.S. Cl.
CPC ............ *A23N 1/02* (2013.01); *A22C 17/0026* (2013.01); *A23L 2/04* (2013.01); *A23L 5/20* (2016.08); *A23L 19/09* (2016.08); *A23V 2002/00* (2013.01)

(58) Field of Classification Search
CPC . A23N 1/02; A23L 2/04; A23L 1/2128; A23L 1/015; A23L 5/20; A23L 19/09; A22C 17/0026; A23V 2002/00
See application file for complete search history.

(56) References Cited

U.S. PATENT DOCUMENTS 2,242,557 A * 5/1941 Urschel .................... B26D 3/18
83/116
2,614,597 A * 10/1952 Magnus .................. B02C 18/00
241/224

(Continued)

FOREIGN PATENT DOCUMENTS

DE           923880      *  2/1955
DE          2936227      *  3/1981
(Continued)

OTHER PUBLICATIONS

English Translation for DE 923880 published Feb. 1955.*
(Continued)

*Primary Examiner* — Anthony Weier
(74) *Attorney, Agent, or Firm* — Avery N. Goldstein; Blue Filament Law PLLC

(57) ABSTRACT

A plant (1) for cold extraction of puree, or juice, from a food product of vegetable origin, or animal includes a treating machine, for example a softening machine (20) downstream of which a machine is provided for extracting (30) in which it is obtained the extraction of juice, or puree, from a food product of vegetable origin. Upstream of the treating machine (20) a division machine is provided (40, 40') in which a division means is arranged to divide the starting food product of vegetable origin into parts of predetermined size. More in detail, in case of fresh vegetables, i.e. preserved at a temperature set between about 2 and 4° C., a division means is provided (40) arranged to provide the division of the vegetable product (100) into parts (105) of size set between 50 mm and 130 mm, advantageously, set between 80 mm and 110 mm, for example about 100 mm, which is fed to the above described treating machine (20). Instead, in case of frozen food product of vegetable origin, the division means (40') is arranged to provide the division (Continued)

of the frozen product (102) into parts (103) of size substantially equivalent to the single pieces contained in the block, or cake, (102).

37 Claims, 13 Drawing Sheets

(51) Int. Cl.
| | |
|---|---|
| A23L 1/015 | (2006.01) |
| A23L 2/04 | (2006.01) |
| A22C 17/00 | (2006.01) |
| A23L 5/20 | (2016.01) |
| A23L 19/00 | (2016.01) |

(56) References Cited

U.S. PATENT DOCUMENTS

| | | | | |
|---|---|---|---|---|
| 2,696,440 | A * | 12/1954 | Ball | A23L 2/04 426/481 |
| 3,705,475 | A * | 12/1972 | Riley | B65B 35/04 53/240 |
| 4,626,436 | A * | 12/1986 | Bradley | A23L 3/362 426/289 |
| 4,643,085 | A * | 2/1987 | Bertocchi | A23N 1/00 241/260 |
| 4,738,194 | A * | 4/1988 | Ando | A23B 7/0408 62/378 |
| 5,283,078 | A * | 2/1994 | Bertocchi | A23N 1/02 426/482 |
| 5,566,895 | A | 10/1996 | Otto et al. | |
| 7,807,209 | B1 * | 10/2010 | DeJong | A23L 2/02 426/250 |
| 8,367,132 | B2 * | 2/2013 | Bertocchi | A23N 1/02 426/238 |
| 2001/0054420 | A1 * | 12/2001 | Reisig | C13B 10/00 127/55 |
| 2006/0201345 | A1 * | 9/2006 | Neto | A23N 1/003 100/98 R |
| 2007/0269564 | A1 * | 11/2007 | Bertocchi | A23N 1/00 426/489 |
| 2009/0090254 | A1 * | 4/2009 | Herren | A47J 43/0711 99/537 |
| 2011/0244100 | A1 * | 10/2011 | Bertocchi | A23N 1/02 426/478 |
| 2011/0244101 | A1 * | 10/2011 | Bertocchi | A23L 1/2128 426/481 |

FOREIGN PATENT DOCUMENTS

| | | | |
|---|---|---|---|
| DE | 20314246 | * | 1/2004 |
| FR | 2127299 | * | 10/1972 |
| IT | 1199392 B | | 12/1988 |
| IT | 1249363 B | | 2/1995 |
| JP | 2001191292 | * | 7/2001 |
| KR | 20030043136 | * | 6/2003 |
| WO | 9309684 | | 5/1993 |
| WO | WO93/09684 | * | 5/1993 |
| WO | 03034843 | | 5/2003 |
| WO | 2004091323 | | 10/2004 |
| WO | WO 2005/036993 | * | 4/2005 |
| WO | 2005039308 A2 | | 5/2005 |
| WO | 2009063309 | | 5/2009 |
| WO | 2010070433 | | 6/2010 |
| WO | WO2010/070433 | * | 6/2010 |
| WO | WO 2010/070437 | * | 6/2010 |

OTHER PUBLICATIONS

English Translation for DE 2936227 published Mar. 1981.*
English Translation for FR2127299 published Oct. 1972.*
English Translation for JP2001191292 published Jul. 2001.*
English Translation for DE 20314246 published Jan. 2004.*
English Translation for KR 20030043136 published Jun. 2003.*

* cited by examiner

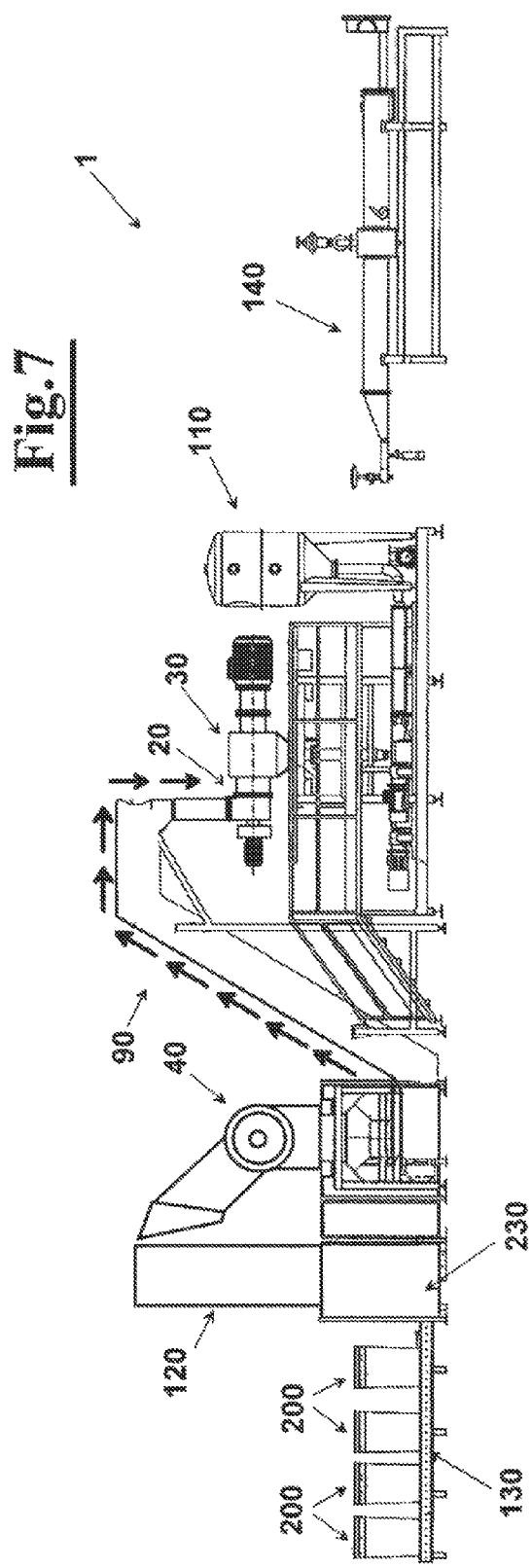

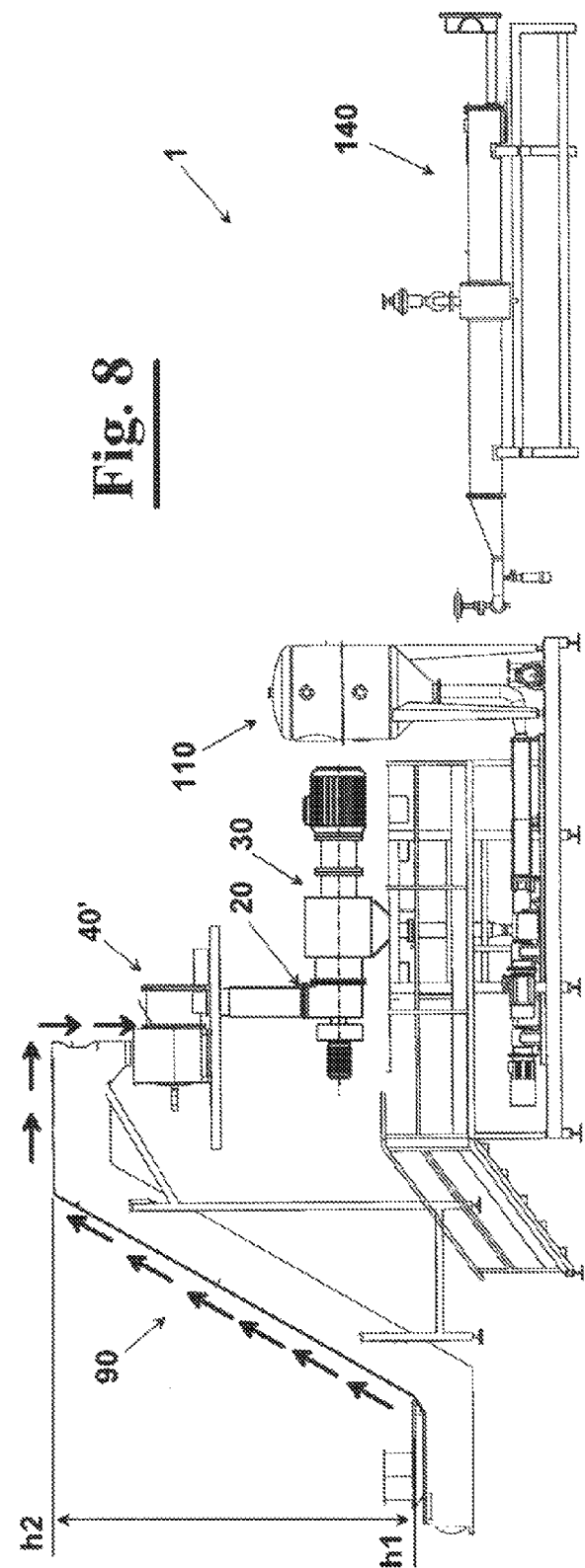

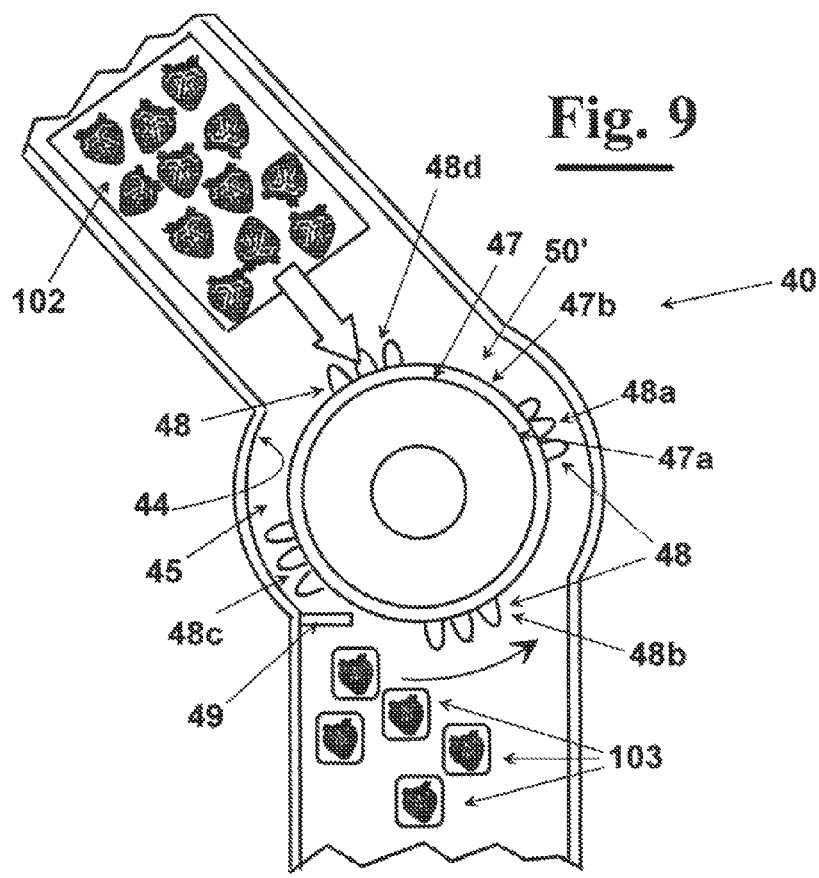
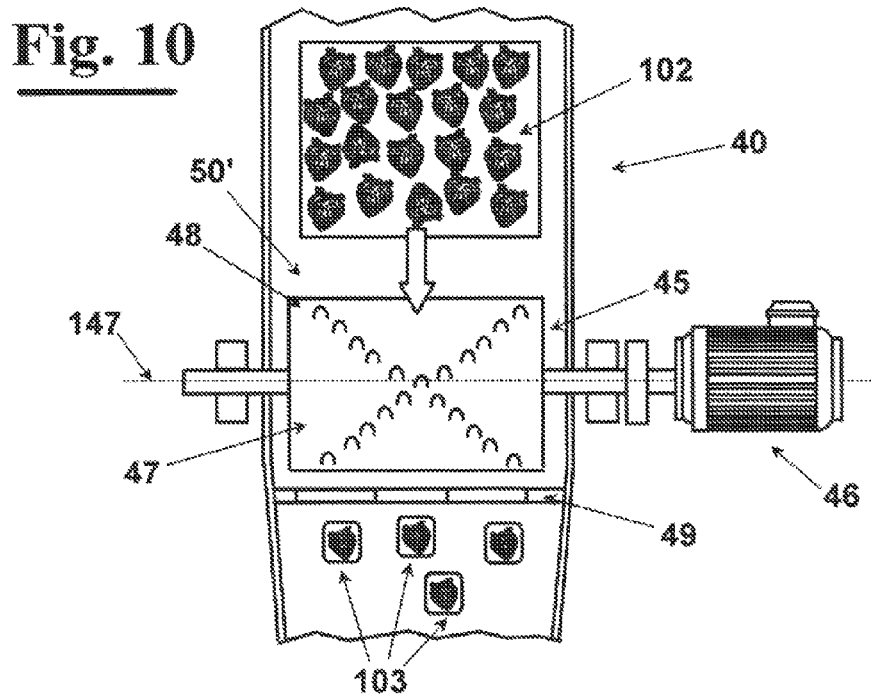

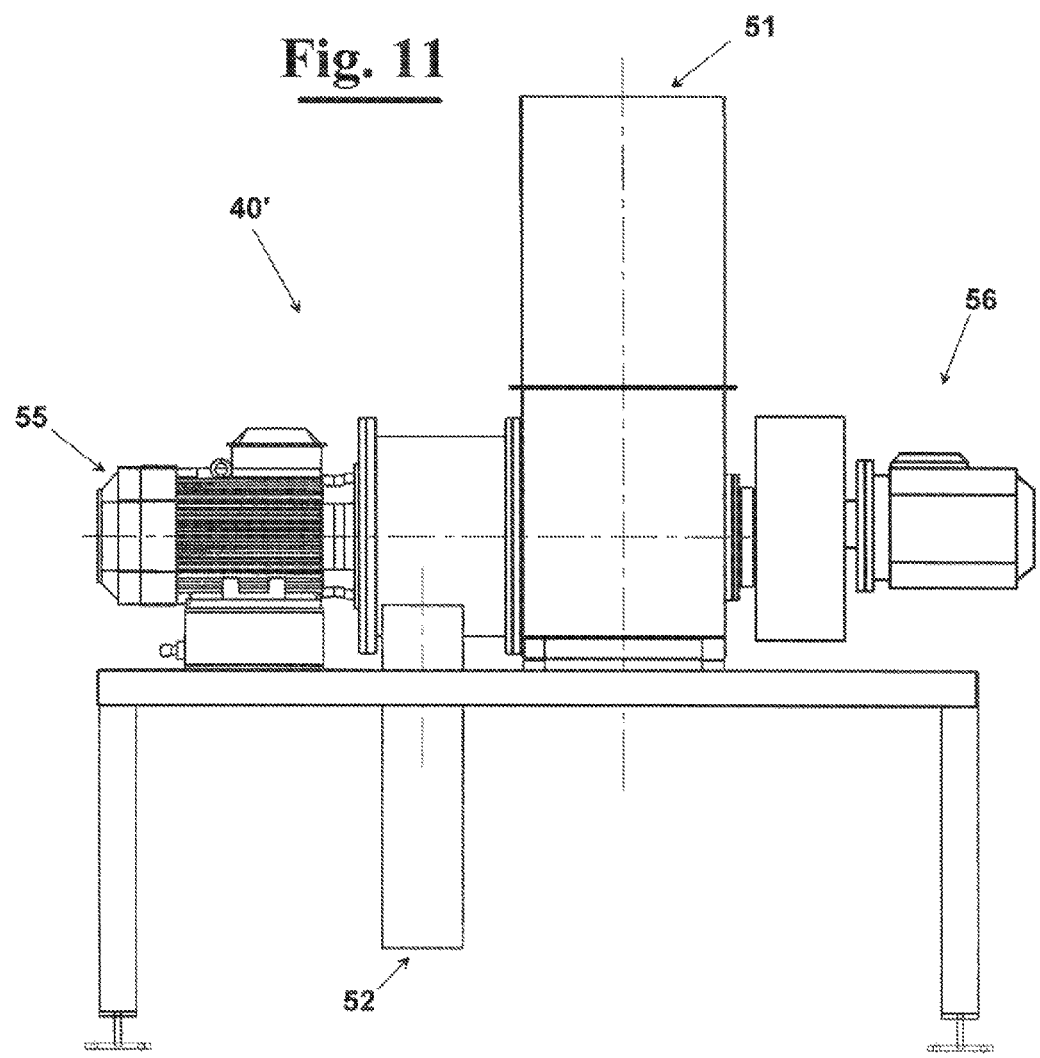

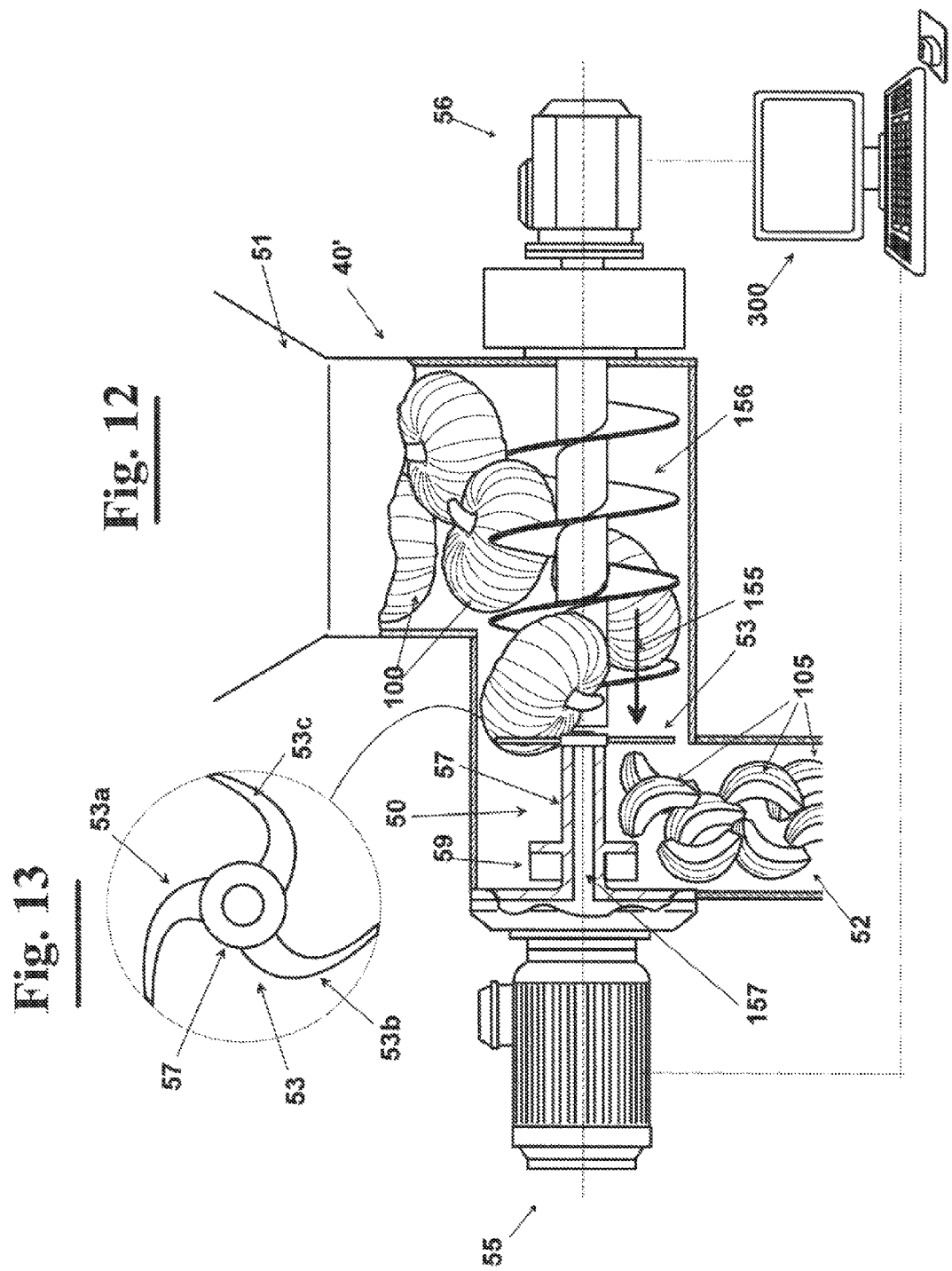

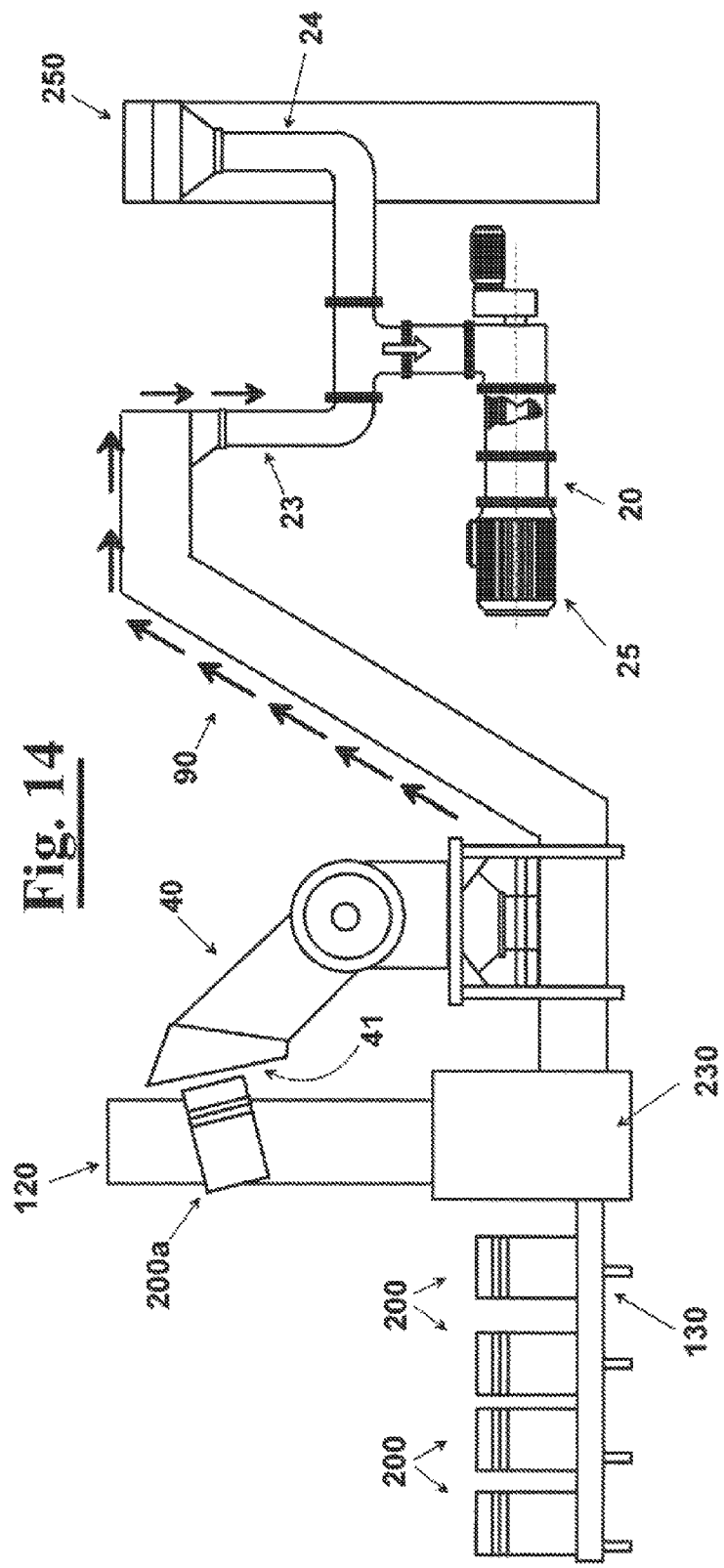

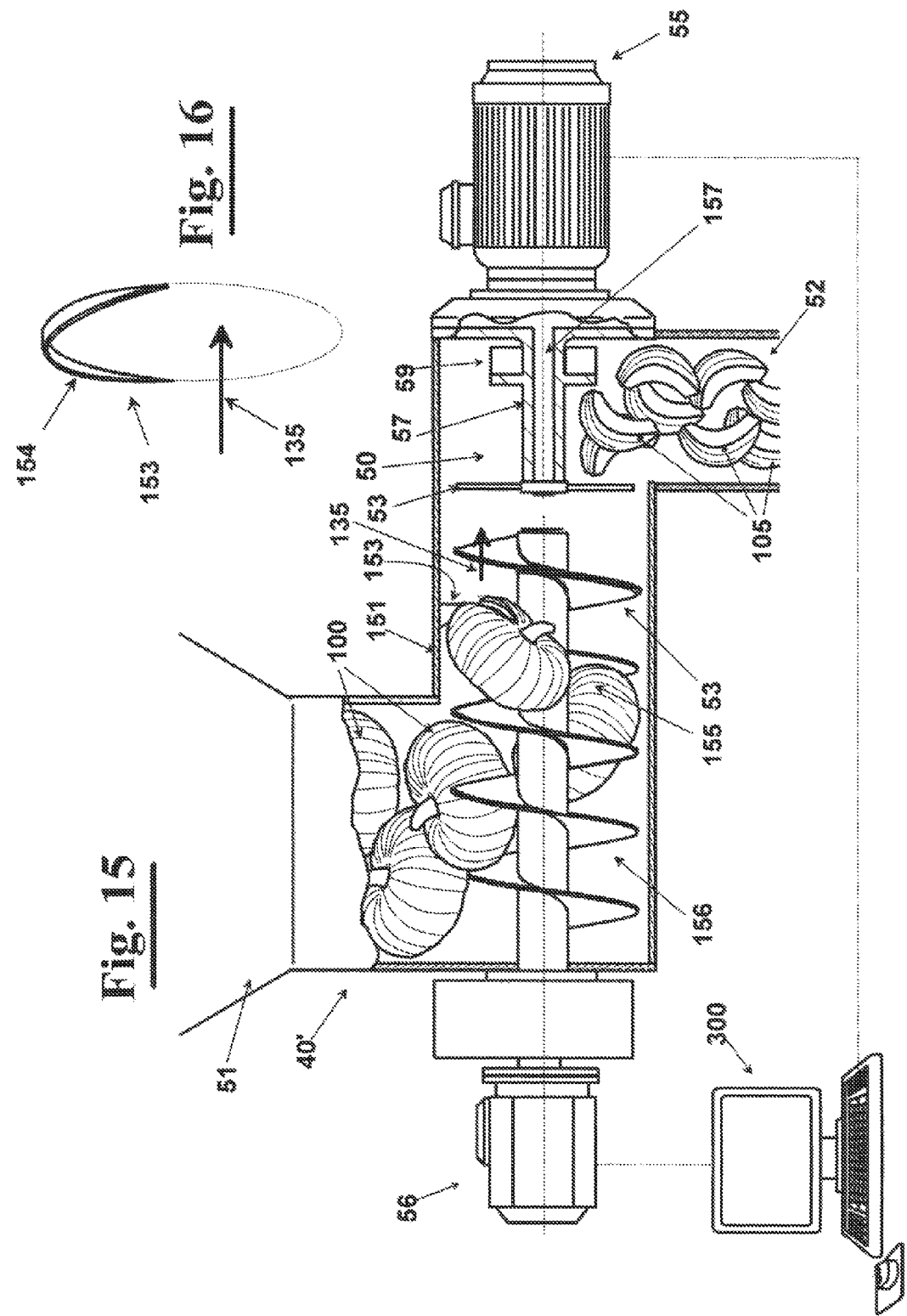

PLANT FOR COLD EXTRACTION OF PUREE OR JUICE FROM FOOD OF VEGETABLE ORIGIN

FIELD OF THE INVENTION

The present invention relates to the field of machines for the food industry, and, in particular, it relates to a plant for extracting puree, or juice from food products, such as food vegetables, for example fruit, or animal, which when initially fed have large size.

The invention relates, furthermore, to a plant for extracting juice and puree from food products, in particular of vegetable origin, or animal, which carries out this method.

DESCRIPTION OF THE PRIOR ART

As well known, a variety exists of types of plants for extracting juice or puree mainly from food products of vegetable origin, fruit and vegetables, but also from animal food, such as meat and fish.

Normally, the product to treat is previously softened or chopped more or less finely in a first step, for being then put in an extraction machine in a second step. The extraction machines of the prior art are essentially made up of a fixed structure that comprises an apertured sheet of cylindrical or conical shape, so-called "sieve", and by an armature with blades that rotates inside. The armature is mounted on a shaft and caused to rotate by a motor.

The chopped product, or softened, which enters extraction machine is pushed radially continuously by the blades against the sieve by centrifugal force. This way it is filtered through the holes of the sieve, producing a puree and a liquid part of the product that is conveyed for being then subject to further treatments. The solid part that cannot pass through the sieve, instead, is conveyed axially opposite to the inlet of the sieve and is automatically brought to a discharge station as a waste material. See on this argument patent No. IT1199392.

A known process of this kind, for example, is the so-called extraction at room temperature, which is carried out in two steps: a first step of softening the food pulps through a plurality of pulses in quick succession and a second step of separation of the useful part (puree or juice) from the waste solid parts, which is carried out in an extracting machine as above described.

During the softening step the pulses in quick succession are obtained by a cylindrical or conical body, or stator, which has protrusions on its inner surface, and by an armature having blades that rotates in the stator pushing by centrifugal force the food pulps against the protrusions, and generating a series of pulses that cause the softening of the food product. See on this subject matter patent n. IT1249363.

In the extraction process at room temperature, according to the state of the art above described, the steps of softening and extracting are carried out in a single compact working unit that has a single motor: the respective softening and extracting armatures are mounted on the same axis and rotate then at the same speed.

See FIG. 1 and the relative description below.

Another solution of the prior art described for example in WO2005039308 comprises, instead, two different drives, respectively one for the softening step and another for the extracting step. This solution permits to treat more or less sensitive products, which are affected by the softening step in a different way, and so to calibrate better the separation between puree and solid parts.

The vegetables from which the puree can be obtained may be fresh or frozen. Even if treating frozen products is much more expensive, because they stay more time in the production cycle than fresh products, using frozen products can be advantageous for keeping the vegetables with time, for covering long distances of transportation and for keeping at most the organoleptic qualities of the vegetables that would be quickly reduced after harvesting.

Presently, in order to extract puree and/or juice from a vegetable product loaded at a temperature lower than zero degrees or in any case completely or partially frozen many different processes can be used.

The product is normally kept at different temperature under zero in various forms and size, such as blocks, barrels, or IQF (Individually Quick Frozen). In the first cases, they are vegetables previously frozen in parallelepiped shape, or also cylindrical shape with the size of a standard barrel of 200 kg. In the IQF case the vegetable product is frozen singularly or in blocks and stored.

Being generically products that are kept frozen for many months and then put on the market, it is necessary to maintain the taste and the qualitative features as much as possible unchanged, for not to spoil products with a higher value than the fresh products.

When exiting from a cold store (temp. from −40° C. to 0° C.) the frozen products have a hardness assimilated to that of the ice and cannot be treated with the devices for making puree from fresh vegetables or already completely defrosted vegetables. Therefore, the product must first be completely defrosted.

Normally, the mostly used defrosting systems are those that use vapour as heat exchange fluid, even if plants are known that use the electric energy directly by means of resistances or indirectly by microwave systems or other devices that exploit electric or magnetic fields. They provide normally a conveyor belt for the product, which is of IQF type, up to a screw conveyor where a direct or indirect injection of the vapour is carried out. In the screw conveyor the product moves slowly and is subject to gradual continuous heating up to a complete defrosting. A possible softening step to assist the extraction can be carried out.

One of the major problems that is met is that a completely defrosted product, in particular of vegetable nature, deteriorates quickly and easily after defrosting. In fact, after only a few minutes from defrosting, enzymatic phenomena occur such as oxidation, that cause a change of the colour, of the consistency and of the taste of the product.

In case of frozen product the extraction plant has some limits to the production rate, mainly given to the size of the blocks of frozen product to treat. Usually, in fact, the not IQF blocks of frozen product fed to the extraction plant are larger than 300×100×500 mm. In this case the vegetable product is simply put in a plastic bag and frozen such that before freezing it forms a humid mix and by freezing it forms a large single frozen block comprising a certain number of fruit pieces, or vegetables.

Some production rate limits also exist to the extraction plants also in case of fresh product of size larger than about 130-150 mm, as in the case of pumpkins, watermelons, melons, etc. In fact, for treating the above described types of vegetable products, the machines should have excessive size with respect to the capacity of the production line in which they are installed.

For overcoming the above described drawbacks, presently, upstream of the machines that perform the extraction of the puree, or the juice, from the starting vegetable product, grinding machines are arranged that cut and chop the fresh product, or frozen product, into parts of reduced size and precisely from several mm to 1-2 cm. These grinding machines are designed for cutting, or chopping, the vegetable product, or frozen product, into parts of size as small as possible, since the smaller the size of the parts fed to the machines that perform the extraction, the higher the efficiency of such machines.

For the above described features, the grinding machines presently used, therefore, often cause a deterioration of the vegetable product. In fact, both in the case of fresh product having temperature between about 2° C. and 5° C., and in the case of frozen product having temperature between about −40° C. and 0° C., the grinding step operated by the grinding machine causes a break of the vegetable product, then freeing oxidative and pectolytic enzymes from the product before completing the extraction of the juice, or the puree, and, accordingly, jeopardizing the quality of the final product.

Another drawback of the presently known extraction plants that treat frozen vegetables, or fresh, of large size, consists of a feeding discontinuity that occurs in the extraction line owing to the presence of both of machines that are only sized for operating with substantially constant capacity, such as the extraction machines and the softening machines, and machines that work in a discontinuous way, like the machines that move bags, or barrels, of frozen product and that load the product in it contained on the conveying lines.

In WO2009/063309, in the name of the same applicant, a machine is described for extracting puree or juice from frozen food. The machine comprises an inlet duct through which the food products in the frozen status are fed. More in detail, the products enter the machine directly as IQF or, in case of frozen products, from barrels, into parts smaller previously triturated and having, for example, size set between 50 mm and 200 mm.

The frozen products that are fed to the machine enter a shredding section comprising a rotor which can rotate at a high speed in a stator, where the product is subjected to pressure pulses in quick succession by the movement of the frozen product between the rotor and the stator. This way, a shredding of the product into fragments of size less than 6 mm and a partial defrosting of the same is obtained. Then, the partially defrosted fragments are fed to an extractor to obtain a puree or juice by moving a sieve.

Also this solution has, therefore, the drawback above described and, in particular, the possibility of damaging the food product during the step of shredding the frozen product into fragments.

SUMMARY OF THE INVENTION

It is then a feature of the invention to provide a plant for extracting puree, or fruit juice, which allows treating both fresh and frozen vegetables, of large size, i.e. of size larger than about 150 mm, without affecting the soundness of the treated vegetables and, accordingly, avoiding affecting the quality of the final product.

It is also a feature of the present invention to provide such a plant for extracting puree, or fruit juice, which allows treating both fresh and frozen vegetables, of large size, obtaining a high production rate.

It is a further feature of the present invention to provide a method for extracting puree, or fruit juice, from vegetables of large size that has the same advantages.

These and other objects are achieved by a plant for extracting puree, or juice, from a food product, in particular a product of vegetable origin, or animal, that is fed at least partly frozen as a block, or cake, each block, or cake containing a plurality of only food products having predetermined size, said plant comprising:

a treating machine for treating a starting product obtaining a treated product;
 a cold extraction machine located downstream of said treating machine, in said extraction machine a rotor is arranged configured to work in combination with a sieve having a plurality of holes, in order to separate said treated product into a main product comprising said puree, or juice, which crosses said sieve and is discharged through a first outlet, and into a waste material that, instead, cannot cross said sieve and is discharged through a second outlet;
 a division machine located upstream of said treating machine, in said division machine a division means is arranged to divide said food product of vegetable origin into parts of reduced size that can be fed to said treating machine;
 whose main feature is that said division means is arranged to divide said block, or cake, into parts of a predetermined size and substantially corresponding to the original size of a single food product of said plurality.

According to another aspect of the invention, a plant for cold extraction of puree, or juice, from a fresh food product, in particular a food product of vegetable origin, or animal, comprises:

a treating machine for treating a starting product obtaining a treated product;
 a cold extraction machine located downstream of the treating machine, in said extraction machine a rotor is arranged configured to work in combination with a sieve having a plurality of holes, in order to separate said treated product into a main product comprising said puree, or juice, which crosses said sieve and is discharged through a first outlet, and into a waste material that, instead, cannot cross said sieve and is discharged through a second outlet;
 a division machine located upstream of said treating machine, in said division machine a division means is arranged to divide said food product into parts of reduced size that can be fed to said treating machine; whose main feature is that said division means is arranged to divide said food product into parts of size set between 50 mm and 130.

In particular, the division means can divide the fresh food product into parts of size set between 80 mm and 110 mm.

Advantageously, the division means is arranged to divide the food product into parts of size set, between about 95 mm and about 105 mm, for example about 100 mm.

In particular, the division means can be operatively connected to shaping means arranged to establish a predetermined size of said products contained in said block, or cake, or of said fresh food product.

Advantageously, the shaping means can be associated with a detection means configured to measure the size of a single product and to generate a corresponding measurement signal, said shaping means arranged to operate said division means to cause said division of said product into parts of size substantially corresponding to the size detected by said means for detecting.

Alternatively, the shaping means can comprise a means for selecting a predetermined food product among a predetermined plurality of food products. In this case, the shaping means is adapted to associate to the selected product a predetermined size corresponding substantially to a single product of the selected species.

In addition, or alternatively, the shaping means comprises a means for selecting a determined size of the single product.

In particular, the treating machine can be selected from the group consisting of:
- a softening machine arranged to soften the starting food product through a plurality of pulses in quick succession obtaining a softened product;
- a grinding machine arranged to grind the starting food product;
- a chopping machine arranged to chop the starting food product;
- a machine in which the product is caused to pass through a sieve;
- a machine in which a cut is obtained of the starting food product;
- or a combination thereof.

In a first exemplary embodiment, the division means can comprise a cutting means that is arranged to cut said food product of vegetable origin for dividing it into a predetermined number of parts having size set between 50 mm and 130 mm. Such structure is used in particular if the starting vegetable or animal food is a fresh product, i.e. it is fed to the plant at a temperature higher than 0° C. without having been previously subject to freezing processes.

In the case in which, instead, the treated product is a food product, in particular of vegetable origin, which is at least in part frozen, the division means comprise a division roller housed within a division chamber and arranged to rotate about a rotation axis. The division roller is advantageously provided on the outer surface of a plurality of teeth configured to penetrate at least partially in said block, or cake, at least partly frozen for dividing it into parts of size substantially corresponding to a single piece contained in the frozen product.

Preferably, the teeth of the division roller have curved profile.

Advantageously, in the division chamber a grid is provided, or a reticular structure, having meshes of predetermined size, advantageously of size substantially equivalent to the single piece contained in the block, or cake, of frozen product. More in detail, the grid is adapted to keep the parts of size larger than the size of the meshes that are, then, further crossed by the teeth, which can have a curved profile, up to forcing the parts to pass downstream of the grid, obtaining a size less than the meshes of the grid.

Advantageously, the treating machine comprises:
- a first feeding duct arranged to connect the division machine with the treating machine;
- at least a second feeding duct for a food product;
- a means for selectively connecting said first and said second feeding duct with said treating machine, in order to feed to said treating machine, respectively, parts of size set between 50 mm and 130 mm obtained by said division machine, or a whole food product of size already set between 50 mm and 130 mm to the treating machine.

Advantageously, furthermore, a lifting conveyor means is provided arranged to lift a food product from a first height h1 to a second height h2.

In particular, the lifting conveyor means, for example a sloped conveyor belt, can be located upstream of the division machine. In this case, the lifting conveyor means is arranged to lift fresh food, or at least partially frozen, from a first height h1 to a second height h2 at which the food product is put in the division machine.

Alternatively, the lifting conveyor means can be arranged between the division machine and the treating machine. In this case, the lifting conveyor means is arranged to lift parts of food product, in particular of size set between about 50 mm and about 130 mm, obtained by the division machine from a first height h1 to a second height h2 at which the parts of food product are put in the treating machine.

In particular, the lifting conveyor means is associated with a weighing means configured to measure the weight of said food products, such that it is possible to feed in a controlled way the food product to the division machine, or to the treating machine. In particular, the lifting conveyor means and the weighing means is configured to provide a substantially constant supply of the food product.

The weighing means, for example, can comprise at least one load cell are configured to measure the product and to generate a corresponding electric weight signal for sending it, then, to a control means operatively connected to motor means of said division machine. This way, by adjusting the motor means, advantageously having an inverter, of the division machine and the speed of the lifting conveyor means it is possible to feed in a controlled way and substantially fixed the product to treat to the division machine.

Advantageously, the cutting machine comprises:
- a conveying means operated by first motor means, said conveying means arranged to cause the movement of said food product along a, conveying direction with a predetermined conveying speed;
- a cutting means arranged along said feeding direction, said cutting means being operated by a second motor means in order to cut said feed into parts of predetermined size at a predetermined cutting speed;
- an adjustment means for said first and of said second motor means, said adjustment means arranged to control said conveying speed and said cutting speed in order to adjust the size of the cut parts of said food product.

In particular, the cutting means is operated by a motor means, said cutting means comprising a tubular portion which is integral to at least one cutting blade, said tubular portion mounted directly to a drive shaft of said motor means and comprised of a thrust bearing mounted to said tubular portion.

Advantageously, if said food product is provided frozen in bags, or barrels, a loading means is provided for load to said division machine comprising a gripping means of said bag, or barrel. In particular, the gripping means is slidingly mounted to a support structure for raising said bag, or barrel, from a gripping height hp to a discharging height hs at which said bag, or barrel is tilted for putting its content of said division machine through an a feeding inlet.

In particular, the cutting means can comprise a movable cutting means, in particular of the type above described, and a fixed cutting means, for example with an arc shape. More in detail, the fixed cutting means is arranged integral to a body of the cutting machine at an upstream position of the movable cutting means with respect to the conveying direction of the product in the machine same. In particular, the fixed cutting means have a profiled cutting edge arranged to provide a preliminary cut of the food product before that it reaches the movable cutting means.

According to a further aspect of the invention, a method for extracting puree, or fruit juice, from a food product, in particular from a food product of vegetable origin, or animal, comprises the steps of:
- treating a starting product obtaining a treated product;
- carrying out a cold extraction of the product, by a rotor that is configured to work in combination with a sieve having a plurality of holes, in order to separate said treated product into a main product comprising said puree, or juice, which crosses said sieve and is discharged through a first outlet, and into a waste material that, instead, cannot cross said sieve and is discharged through a second outlet;

carrying out a division of said food product upstream of said treating step, said division configured to make parts of a predetermined size arranged to undergo said treating step;

setting said predetermined size of said parts, said predetermined size corresponding substantially to the original size of a single product of said plurality;

and wherein said division is arranged to divide said block, or cake, of frozen product into parts having said predetermined size chosen in said step of setting.

According to still a further aspect of the invention a method for cold extraction of puree, or fruit juice, from a fresh food product, in particular a food product of vegetable origin, or animal, comprises the steps of:

treating a starting product obtaining a treated product;

cold extraction of said product, said extraction being obtained by a rotor that is configured to work in combination with a sieve having a plurality of holes, in order to separate said treated product into a main product comprising said puree, or juice, which crosses said sieve and is discharged through a first outlet, and into a waste material that, instead, cannot cross said sieve and is discharged through a second outlet;

carrying out a division of said food product upstream of said treating step, said division configured to make parts of a predetermined size arranged to undergo said treating step;

wherein the division is made by a division means arranged to divide the food product into parts of size set between 50 mm and 130.

BRIEF DESCRIPTION OF THE DRAWINGS

The invention will be now shown with the following description of an exemplary embodiment thereof, exemplifying but not limitative, with reference to the attached drawings in which:

FIGS. 3,4,5,6,7 and 8 show an elevational side view of some possible exemplary embodiments of the plant of FIG. 1 provided by the present invention;

FIGS. 9 and 10 show respectively an elevational side view and an elevational front view with cross sectioned details of a first exemplary embodiment of the division means of the invention;

FIG. 11 shows an elevational side view of the division machine in which the division means of FIGS. 9 and 10 are housed;

FIG. 12 shows a partial cross sectional view of an exemplary embodiment of the division machine shown in FIGS. 9 to 11;

FIG. 13 shows in detail an elevational front view of the division means housed within the division machine of FIG. 12;

FIG. 14 shows an elevational side view of a further exemplary embodiment of the plant of FIG. 1;

FIG. 15 diagrammatically shows a partial cross sectional view of an exemplary embodiment of the division machine of FIG. 13;

FIG. 16 shows a perspective elevational side view of the auxiliary fixed cutting means that has the machine of FIG. 15.

DESCRIPTION OF EXEMPLARY EMBODIMENTS

Figure 1:
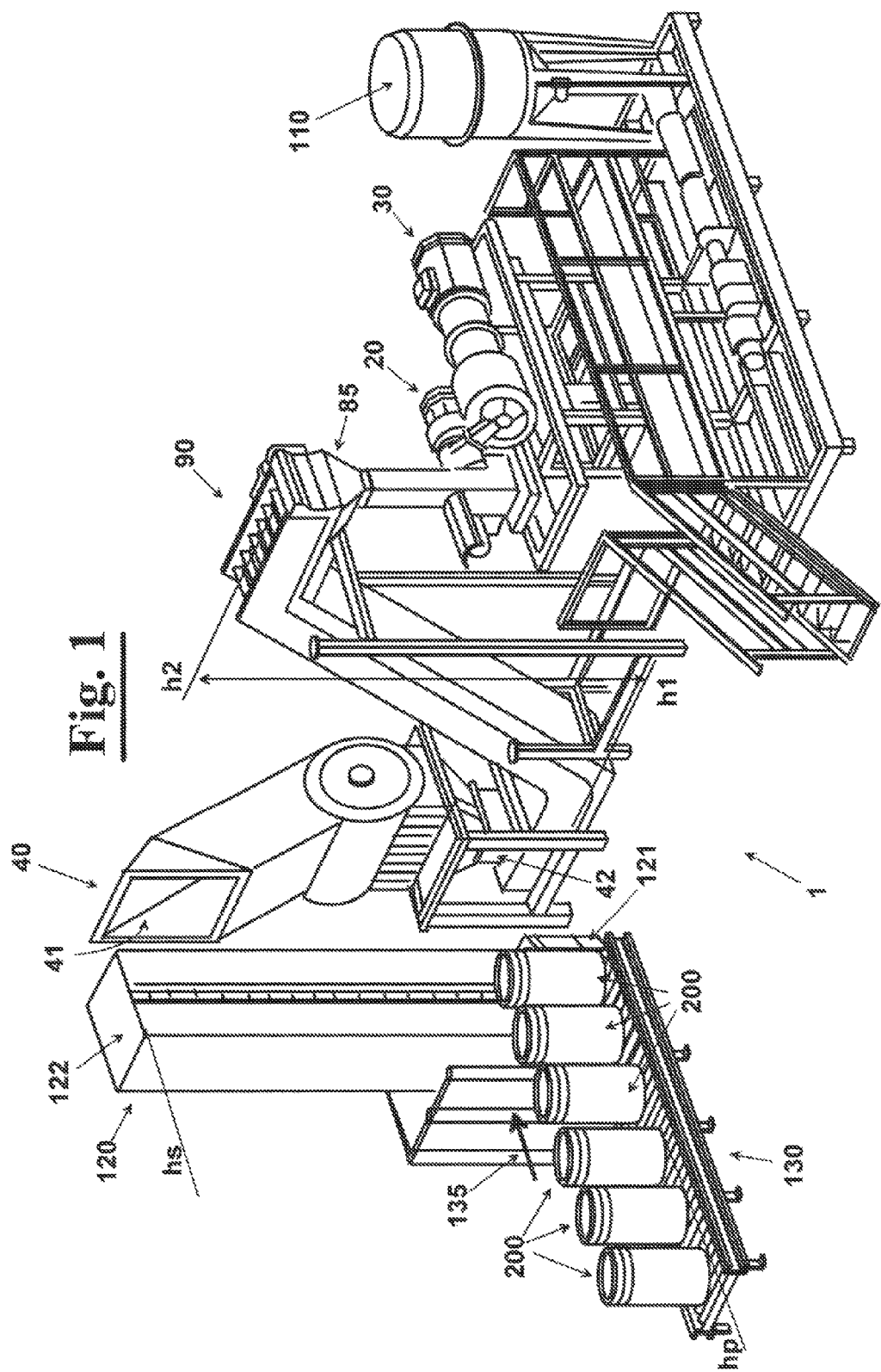
FIG. 1 diagrammatically shows a perspective elevational side view of a first exemplary embodiment of a plant, according to the invention, for extracting puree, or juice, from products of vegetable origin of large size.

In FIG. 1 for example a plant 1 is shown, according to the invention, for cold extraction of puree, or juice, from a food product, in particular of vegetable origin, or animal. The plant 1 comprises a treating machine, for example a softening machine 20 arranged to soften a starting product obtaining a softened product through the transmission of a succession of pulses in quick succession, as described in IT1249363.

Figure 3:
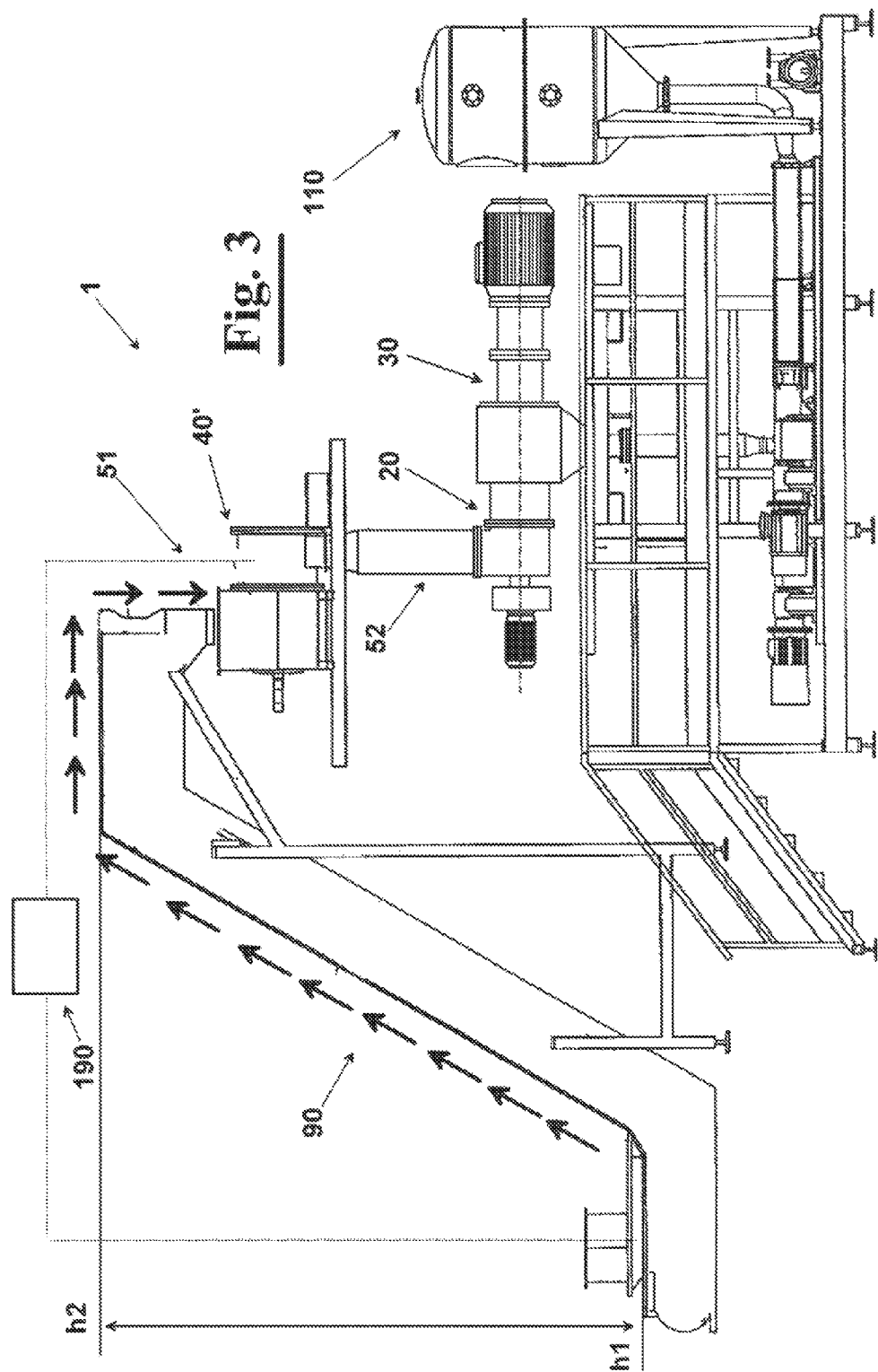

Downstream of the treating machine 20 a cold extraction machine 30 is then provided in which, in a known way and for example as described in IT1199392, but not shown in detail in the figures, advantageously a rotor is arranged that operates in combination with a sieve having a plurality of holes, in order to separate the product, in particular softened, or chopped, into a main product comprising the puree, or the juice, which crosses the sieve and is discharged through a first outlet, and into a waste material that, instead, cannot cross the sieve and is discharged through a second outlet. The treating machine, for example the softening machine 20 and the extraction machine 30, can be combined in a single machine as shown in FIG. 3, or two separate machines. In the latter case the outlet of the softening machine 20 is connected to the entrance of the extraction machine 30 by at least one connection duct; on this subject see for example FIG. 1.

According to the invention, upstream of the treating machine 20 a division machine is provided 40, or 40', in which a division means operate arranged to divide the starting food product into parts of predetermined size.

More in detail, in case of frozen food product, the division means 50' is adapted to cause the division of the frozen product 102 into parts 103 of size substantially equivalent to the single piece contained in the block, or cake, 102.

Instead, in case of fresh vegetables, i.e. preserved at a temperature set between about 2 and 4° C., a division means is provided 50 arranged to cause the division of the vegetable product 100 into parts 105 of size set between 50 mm and 130 mm, advantageously, set between 80 mm and 110 mm, for example about 100 mm, which are fed to the above described treating machine 20.

In an exemplary embodiment, the division means 50 comprises a cutting means 53 arranged to cut the food product 100, for example pumpkins, watermelons, and other pieces of food of similar size, for dividing them into a predetermined number of parts of a predetermined size, for example set between 50 mm and 130 mm.

Figure 4:
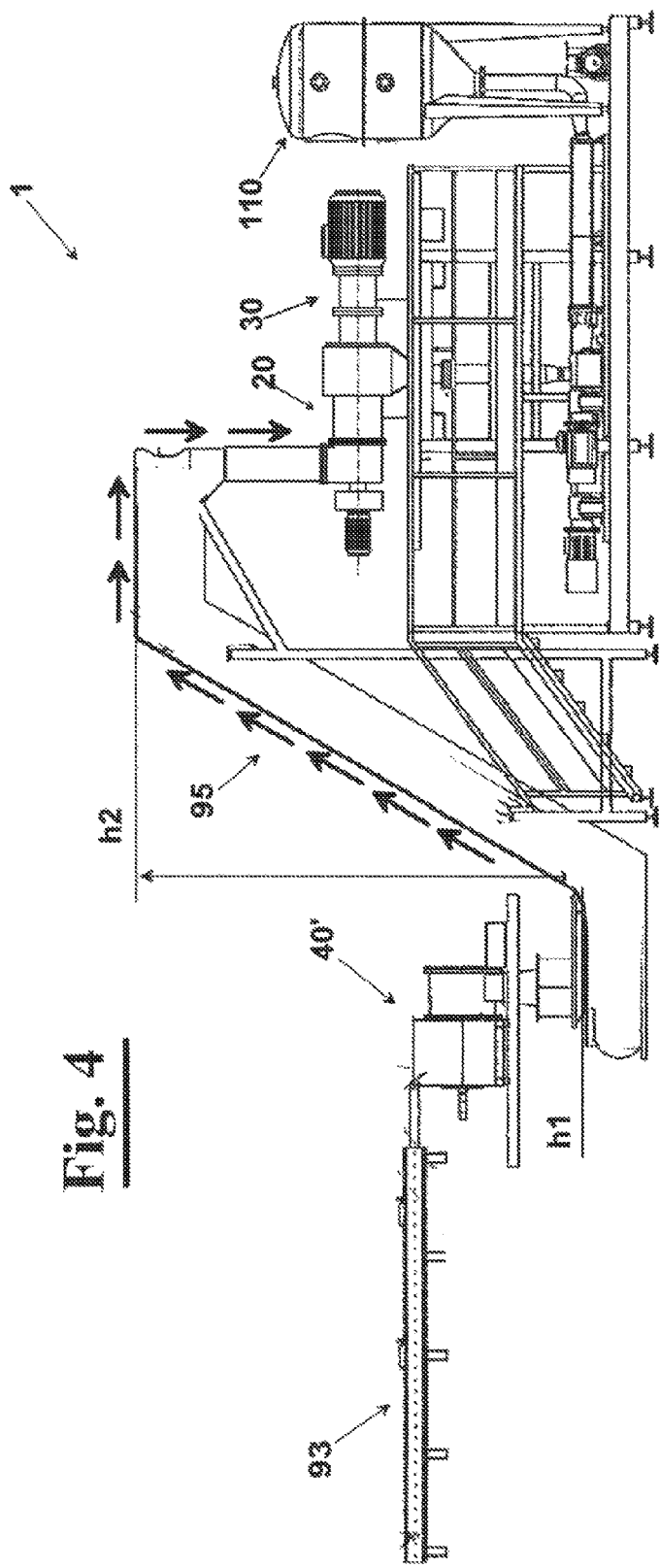

The food products 100 can be sent to the division machine 40 by a conveyor belt 93 (FIG. 3), or a lifting conveyor belt 90 (FIG. 4), according to the position of the division machine 40 with respect to the other apparatus for the plant 1.

The cutting means 53 can comprise a certain number of knives, for example 3 cutting blades 53a, 53b and 53c, integral to a tubular support 57 mounted directly to the shaft 54 of a motor 55.

In a possible exemplary embodiment, instead, the division machine comprises a division chamber 45 in which a division means 50' operates, arranged to divide the food product, at least in part frozen, into a plurality of parts of a predetermined size. More in detail, as diagrammatically shown in FIGS. 9 and 10, a block, or cake of frozen food product, in particular of vegetable origin, contains more products, for example fruit, such as strawberries, of reduced size compacted set in a block frozen product 102. In this case, the division means 50' are arranged to divide the cake, or block, of vegetable frozen product into parts of size substantially equivalent to the of a single vegetable product, for example of a single fruit, such as a strawberries 103. For example, the division means 50' may comprise, in this case, a division roller 47 arranged to rotate about a rotation axis 147 operated by a motor means 46 and equipped on the side surface with a plurality of teeth 48, in particular having curved profile.

Teeth 48 are adapted to penetrate the product, i.e. a frozen product 102, containing normally many food pieces of small size, such as strawberries, dividing it into parts 103 of a predetermined size and selected according to the type of frozen treated product. The teeth 47 are configured to penetrate the blocks, or cakes, of product at least in part frozen, avoiding in the meantime to smash them and, accordingly, to damage the single fruit pieces that, therefore, remain integer. A preferred exemplary embodiment provides that teeth 48 have a curved profile to overcome the difficulties of the grinding machines of the prior art that cut the frozen food product with sharp teeth, or smash them, damaging unavoidably the taste of the food product same.

More in detail, a predetermined number of groups can be provided, for example, four groups 48a, 48b, 48c and 48d of teeth with curved profile arranged at predetermined angular positions of the roller surface 47, in order to alternate zones 47a of the roller in which teeth 48 are provided to zones 47b of the roller without teeth 48.

In the division chamber 45, furthermore, a grid 49 can be provided having meshes of predetermined size for example substantially equivalent to that of the frozen treated product, and delimiting with a wall 44 the division chamber 45. More in detail, the presence of grid 49 is adapted to keep, in division chamber 45, the parts of product having size larger than the size of the meshes that are, then further penetrated by teeth 48. This way, it is reduced further the size of the parts of food product at least partly frozen present in the division chamber 45 up to obtaining parts of size less than the meshes that then pass go beyond grid 49.

According to the invention, furthermore, roller 47 is provided removable for being replaced with a different roller 47, in particular having teeth with curved profile 48 with different shape and distributed in a different way on its side surface. In particular, according to the type and the size of the frozen vegetable product it is possible to use a roller 47 configured to provide the division of a block into parts of size substantially corresponding to the single fruit piece.

The plant 1 can further comprise a lifting conveyor means 90.

In an exemplary embodiment, the lifting conveyor means 90, for example a sloped conveyor belt, is located upstream of the division machine 40, or 40', and performs the lifting of the still integer fresh products, such as fruit and vegetables of large size that require the division into parts of size set between 50 mm and 130 mm. The fresh vegetables are raised by the lifting conveyor means 90 by a starting height h1 to a final height h2, with h2>h1, at which they are introduced, for example by a hopper, in the division machine 40' (FIGS. 3 and 8).

In the exemplary embodiments shown in FIGS. 1, 2, 4 and 7, instead, the lifting conveyor means 90 is arranged between the division machine 40, 40' and the treating machine 20. In this case, the lifting conveyor means 90 is adapted to bring the parts discharged by the division machine 40 having size set between about 50 and about 130 mm, from the height h1 to the height h2, at which the parts are put in the treating machine 20.

In a preferred exemplary embodiment, the lifting conveyor means 90 is associated with a weighing means 190, for example one or more load cells, configured to measure instantly the weight of the food, or pieces of food, which are arranged on the lifting conveyor means 90 and to generate a corresponding electric weight signal that is sent to a control means operatively connected to the motor means 47, or 56, of the division machine 40, or 40'. This way, it is possible to adjust the motor means 47, or 56, and the conveyor means 90 on the basis of the electric weight signal, for feeding in a controlled and fixed way the food, or the parts of food to the treating machine 20.

As shown in detail in FIG. 12, in the cutting machine 40' a conveying means is provided 156, for example a screw conveyor, operated by a first motor means 56, for causing the movement of the food product inserted through an inlet 51, along a conveying direction 155 with a predetermined speed.

In the cutting machine 40', furthermore, cutting means 53 is arranged along the conveying direction 155 and configured to cut the fresh product of vegetable origin 100 into parts 105 of size set between 50 mm and 130 mm with a predetermined cutting speed for being then discharged by the machine through an outlet 52.

As shown in detail in FIGS. 12 and 13, the cutting means 53 can be movable, for example operated by a second motor means 55, or it can be fixed, i.e. integral to the body 151 of the machine 40, or it can be a combination thereof.

The cutting means 53 can comprise a tubular portion 57 integral to a predetermined number of cutting knives, for example three cutting blades 53a, 53b and 53c (FIG. 13). The tubular portion 57 can be advantageously mounted directly to a drive shaft 157 of the motor means 55. Such technical solution avoids the use of a shaft held by two couples of bearings and connected to the motor 55 by means of a joint and, accordingly, of making remarkably easier the structure of machine 40'. However, for reducing the actions on drive shaft 157 and, in particular, the axial forces, a thrust bearing 59 is mounted between the tubular portion 57 and the body of machine 40'. In particular, the tubular portion 57 is slidingly arranged on the drive shaft 157 by a axial flexible connection, for example a ring of deformable material, or with a spring ring.

In the exemplary embodiment of FIGS. 15 and 16, in addition to the movable cutting blade 53 a fixed cutting blade 153 can be provided, for example with an arc shape. More in detail, the fixed blade 153 is arranged integral to the body 151 of the cutting machine 40' upstream of the movable cutting means 53 with respect to the conveying direction 155 of the product in machine 40'. In particular, the fixed cutting means 153 is adapted to provide a preliminary cut of the food product by a profiled cutting edge 154 before it reaches the movable cutting means 53.

Furthermore, an adjustment means can be provided 300 of the first and/or the second motor means 55, 56, for example having an inverter. More in detail, according to the invention the adjustment means 300 allows adjusting the speed and, accordingly, the cutting speed in order to control the size of the cut parts 105 of the food product.

More in detail, if both movable cutting means 53 operated by a motor means 55 and fixed cutting means 153 are provided, or only a movable cutting means 53 is provided, it is possible to control the speed of the cut made through the machine by adjusting the motor means 55 and/or the motor means 56.

If the food product is provided to the plant 1 frozen and contained in bags, or barrels 200, a loading means 120 is provided to the division machine 40 comprising a gripping means 121 of the bag, or barrel 200, sliding on a support structure 122 for bringing the bag, or barrel 200, from a gripping height hp to a discharging height hs at which the bag, or barrel 200, is tilted and its content is put in the division machine 40 through a loading mouth 41 (FIG. 1).

Figure 2:
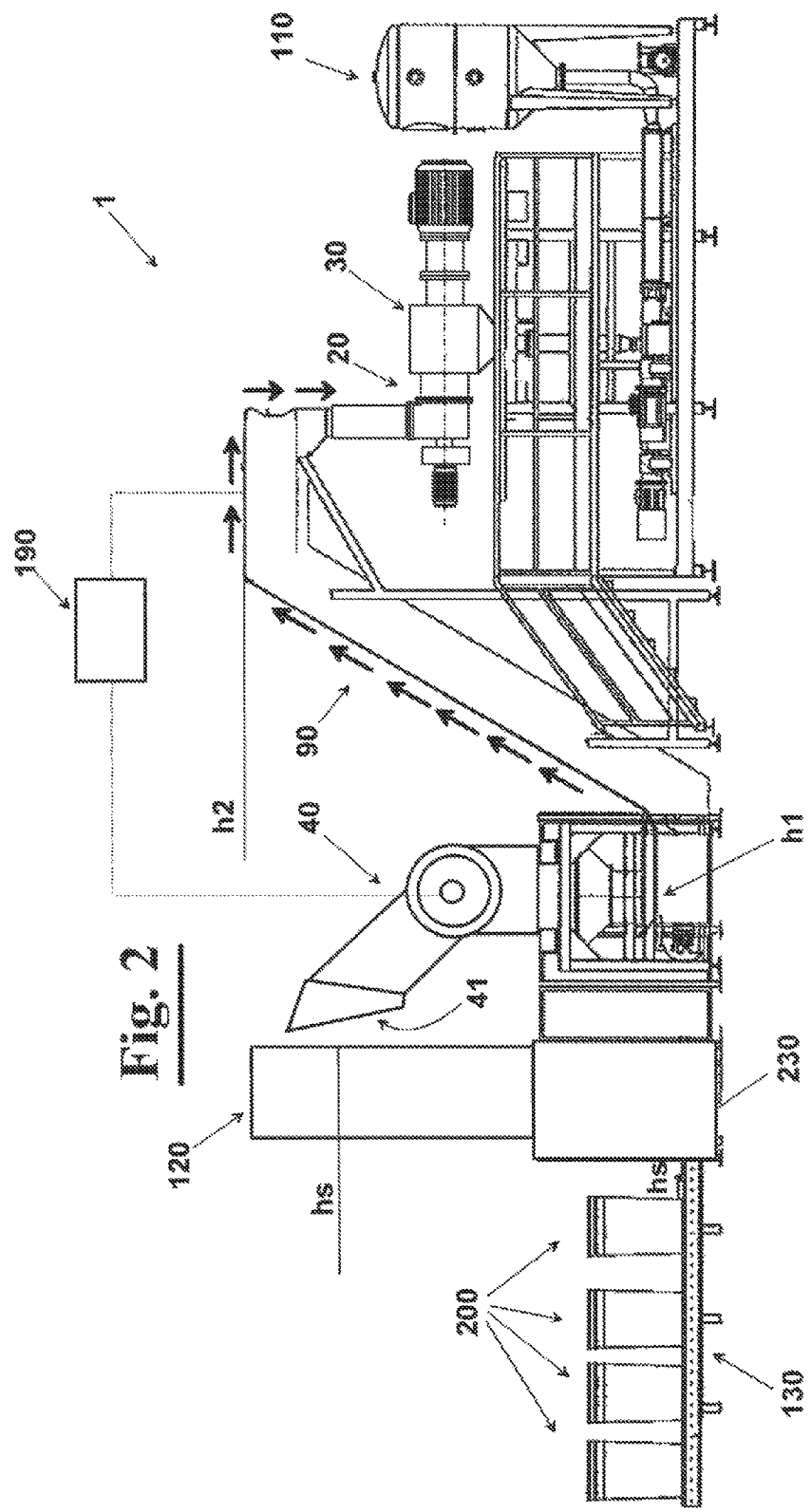
FIG. 2 shows the plant of FIG. 1 an elevational side view thereof.

In a further exemplary embodiment of FIG. 2 both a loading means 120 upstream of the division machine 40 and a lifting conveyor means 90 are arranged between the division machine 40 and the treating machine 20.

Figure 5:
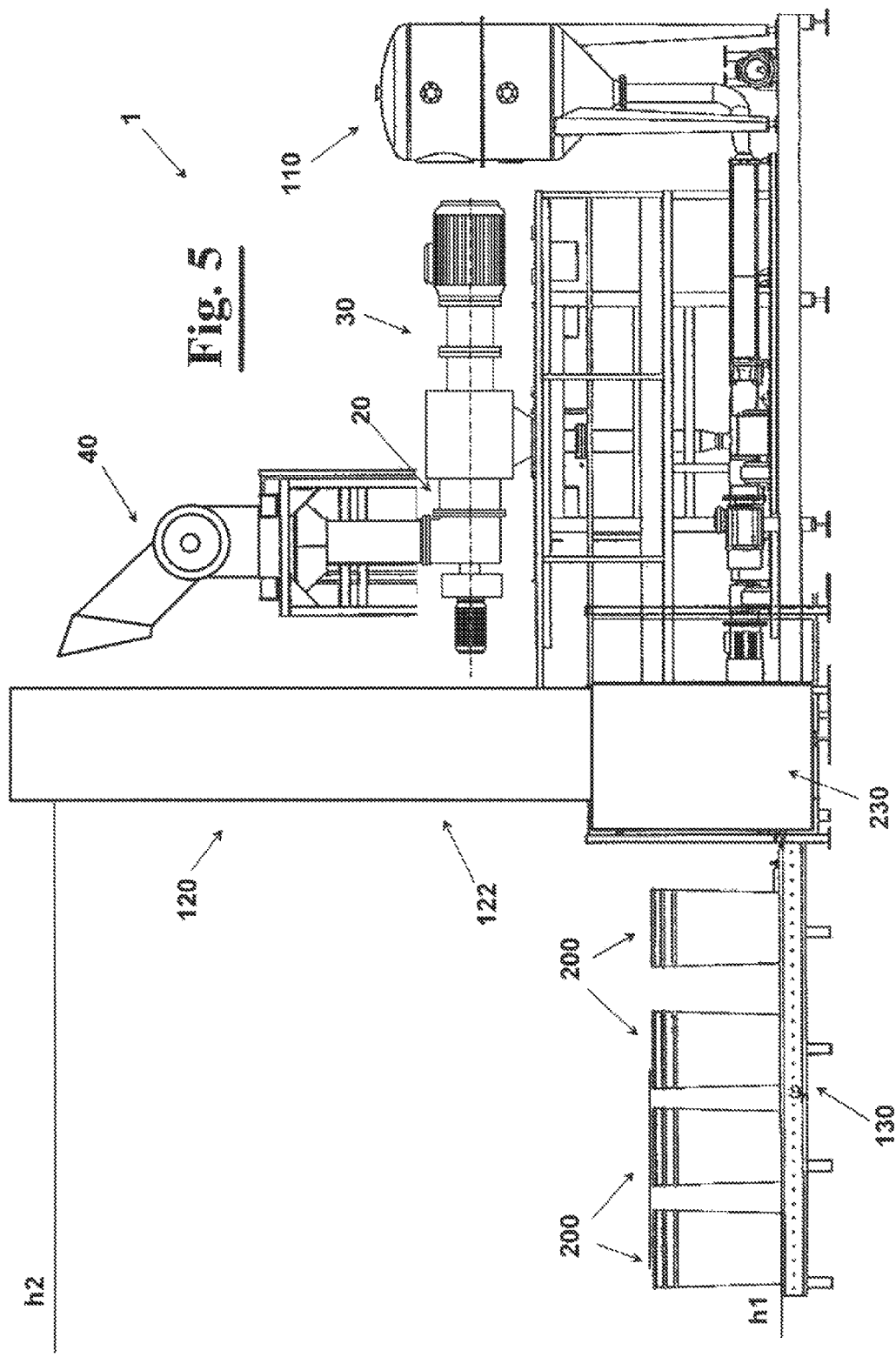
Figure 6:
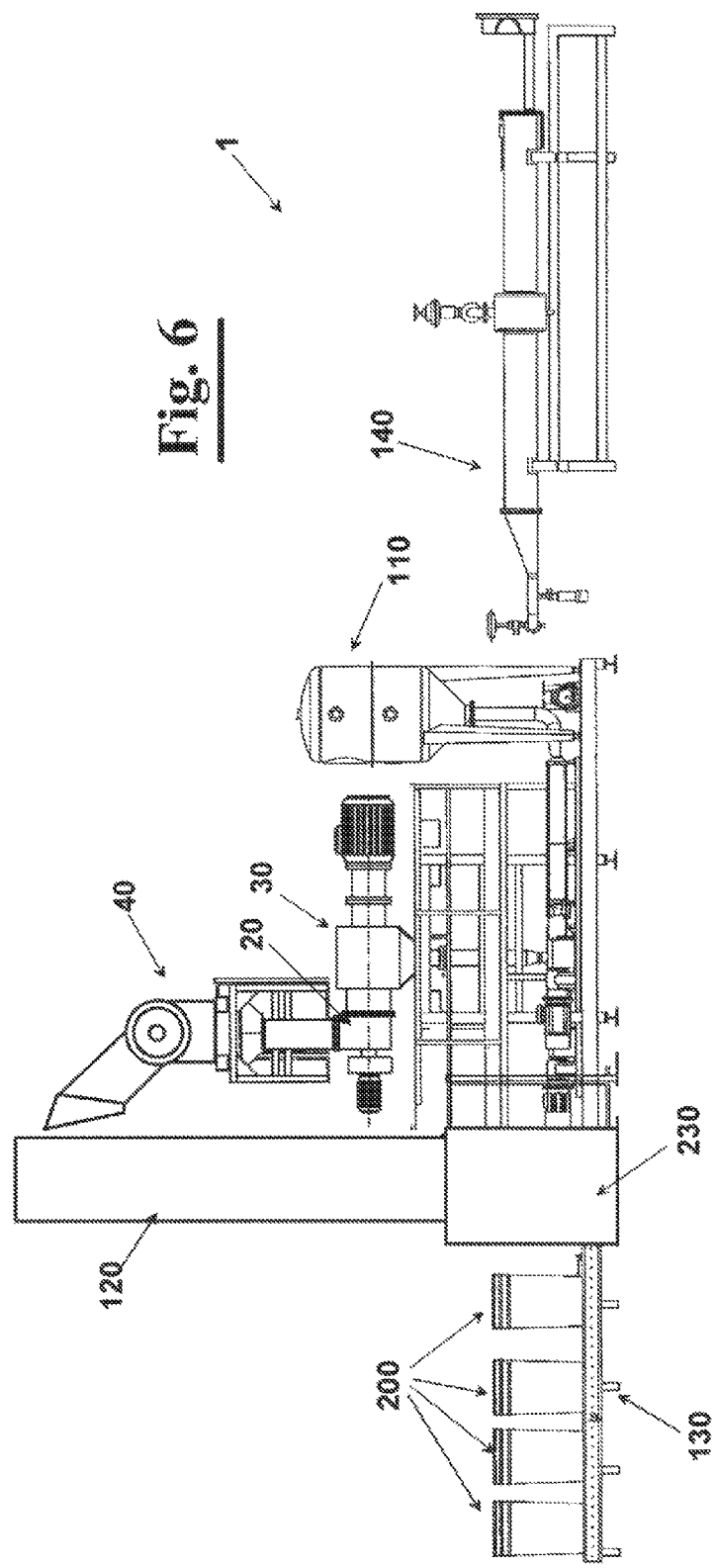

In the exemplary embodiment of FIG. 5, instead, only the loading means 120 are provided upstream of the division machine 40. In this case, the layout of the plant 1 provides the division machine 40 above the treating machine 20 such that the movement of the parts of food product by the division machine 40 to the treating machine 20 is made through gravity.

The bags, or barrels 200, of frozen product can be arranged at first on a conveyor belt, for example a roller conveyor belt 130 arranged to cause the movement of the same along a conveying direction 155 and arrange, then the bags, or barrels 200 at the loading means 120.

In an exemplary embodiment, along the conveying direction 155 is arranged a preliminary heating station 230 at which a heating means is provided not shown in detail in the figure, for example a vapour jet, or a electric winding heat exchanger, which is arranged to cause a first defrosting of the barrels 200 to assist the following step of discharging the food contained in the bags, or barrels 200 same in the division machine 40, or 40'. More in detail, the quick defrosting made in the preliminary station 230 is adapted to detach the frozen food from the inner surface of the barrels, or bags 200.

As shown in FIGS. 1 to 8, the plant 1 can comprise also a de-aeration station 110, in which de-aerating the product, and/or a station of enzymatic inactivation 140 in which, as well known, the product is heated for being brought to a temperature higher than a temperature of enzymatic inactivation. Furthermore, other machines can be provided to treat the product by further processes before its final exit from plant 1.

In an exemplary embodiment of the invention, as shown in FIG. 14, a first feeding duct 23 is provided arranged to connect the division machine 40, or 40', with the treating machine 20 and at least one second feeding duct 24 arranged to connect the treating machine 20 same with a device for loading the vegetables that do not require a reduction of the size because already of a predetermined size, in particular less than 130 mm. The first and the second feeding duct 23 and 24 can be operated selectively for feeding to the treating machine 20, respectively, the parts of food product from the division machine 40, or 40', or the food as such.

The foregoing description of specific exemplary embodiments will so fully reveal the invention according to the conceptual point of view, so that others, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realise the different functions described herein could have a different nature without, for this reason, departing from the field of the invention. It is to be understood that the phraseology or terminology that is employed herein is for the purpose of description and not of limitation.

The invention claimed is:

1. A plant (1) for cold extraction of puree, or juice, from a food product of vegetable origin at least partly frozen in a block, or cake, each block, or cake containing a plurality of single food product pieces, each of which having a predetermined size, said plant comprising:
   a treating machine (20) arranged to treat a starting product for obtaining a treated product;
   a cold extraction machine (30) located downstream of said treating machine (20), in said extraction machine (30) a rotor is arranged configured to work in combination with a sieve having a plurality of holes, in order to separate said treated product into a main product comprising said puree, or juice, which crosses said sieve and is discharged through a first outlet, and into a waste material that, instead, cannot cross said sieve and is discharged through a second outlet;
   a division machine (40) located upstream of said treating machine (20), in said division machine (40) a division means (50, 50') being provided arranged to divide said food product of vegetable origin at least partly frozen, into parts of reduced size that is fed to said treating machine (20);
   wherein said treating machine is selected from a group consisting of: a softening machine arranged to soften the starting product through a plurality of pulses in quick succession obtaining a softened product, a grinding machine arranged to grind the starting product, a chopping machine arranged to chop the starting product, a first machine in which the starting product is caused to pass through a second sieve, a second machine in which a cut is obtained of the starting product, or a combination thereof;
   wherein said division means (47, 48) is arranged to divide said block, or cake, (102) of food product of vegetable origin at least partly frozen, into a plurality of parts (103), each part of the plurality having a size substantially corresponding to the predetermined size of a single food product piece of said plurality of single food product pieces;
   wherein said food product at least partly frozen in a block, or cake, is provided in bags, or barrels (200), and wherein a means for loading (120) is provided for loading the bags, or barrels into said division machine (40), said loading means (120) comprising a gripping means (121) for gripping each bag, or barrel (200), and that is slidingly mounted on a support structure (122), said loading means (120) arranged to bring said bag, or barrel, (200) from a gripping height hp to a discharging height hs, with hs>hp, at which each said bag, or barrel (200) is adapted to be tilted for introducing its content in said division machine (40) through a loading mouth (41), wherein said division means (50') comprises a division roller (47) housed within a division chamber (45) having the loading mouth, the division roller (47) arranged to rotate about a rotation axis, and provided on an outer surface with a plurality of teeth (48) having a curved profile configured to penetrate at least partially in said block, or cake, of food product at least partly frozen.

2. The plant (1), according to claim 1, wherein said division means is operatively connected to a setting means arranged to set a predetermined size of a single food product to be treated.

3. The plant (1), according to claim 1, wherein said division means (50, 50') comprise a cutting means (53, 153) arranged to cut said food product (100) for dividing it into a predetermined number of parts (105) having said size set between 50 mm and 130 mm.

4. The plant (1), according to claim 1, wherein said division means (50, 50') comprises a cutting means (53, 153) arranged to cut said food product (100) for dividing it into a predetermined number of parts (105) having size set between 80 mm and 110 mm.

5. The plant (1), according to claim 1, wherein said division means (50, 50') comprises a cutting means (53, 153) arranged to cut said food product (100) for dividing it into a predetermined number of parts (105) having size set between 95 mm and 105 mm.

6. The plant (1), according to claim 1, wherein, in said division chamber a grid (49) is provided having meshes of a predetermined size substantially equivalent to the size of a single food piece of said plurality of single food pieces contained in said cake, or block, of at least partly frozen product, said grid (49) arranged to keep the parts having a size larger than said meshes that are, therefore, further penetrated by the teeth (48) having curved profile of said division roller that reduce their size up to obtain a size less than the meshes of the grid (49) that pass downstream of the grid.

7. The plant (1), according to claim 2, wherein said setting means is associated with a detection means configured to measure the size of a single product and to generate a corresponding measurement signal, said setting means arranged to operate said division means to cause said division of said product into parts of size substantially corresponding to the size detected by said means for detecting.

8. The plant (1), according to claim 2, wherein said setting means comprises a means for selecting a determined food product among a predetermined plurality of food products that can be treated, said setting means arranged to associate to said selected food product a predetermined size corresponding substantially to a single food product of the selected food product.

9. The plant (1), according to claim 2, wherein said setting means comprises a means for selecting a size of a single food product.

10. The plant (1), according to claim 1, wherein said treating machine (20) comprises:
   a first feeding duct (23) arranged to connect said division machine (40, 40') with said treating machine (20);
   at least a second feeding duct (24) of a food product arranged to connect the treating machine (20) with a device for loading a food product of vegetable origin that do not require to pass through the division machine (40) for a reduction of the size because the food product is already of the predetermined size; and
   a means for selectively connecting said first and said second feeding duct (23, 24) with said treating machine (20), in order to feed to said treating machine (20), respectively, parts of size set between 50 mm and 130 mm obtained by said division machine (40).

11. The plant (1), according to claim 1, wherein a lifting conveyor means is provided located downstream of said division machine (40, 40'), said lifting conveyor means arranged to lift said food product from a first height h1 to a second height h2 at which said food product is put in said treating machine (20).

12. The plant (1), according to claim 1, wherein a lifting conveyor means is provided arranged between said division machine (40, 40') and said treating machine (20), said lifting conveyor means arranged to lift parts of food product from said division machine from a first height h1 to a second height h2 at which said parts of product are put in said treating machine (20).

13. The plant (1), according to claim 11, wherein said lifting conveyor means is associated to a weighing means configured to measure the weight of said food products such that it is possible to feed in a controlled way said food product to said division machine (40), or to said treating machine (20), said lifting conveyor means and said weighing means being configured to provide a substantially constant supply of said food product of vegetable origin.

14. The plant (1), according to claim 3, wherein said cutting means (53, 153) is a cutting machine (40') comprising:
   a conveying means (156) operated by a first motor means (56), said conveying means (156) being arranged to move said food product of vegetable origin (100) along a conveying direction (155) at a predetermined conveying speed;
   a cutting means (53) arranged along said conveying direction (155), said cutting means (53) being operated by a second motor means (55) in order to cut said food product of vegetable origin (100) into parts (105) of predetermined size at a predetermined cutting speed;
   an adjustment means (300) of said first and of said seconds motor means (55, 56), said adjustment means (300) arranged to control said predetermined conveying speed and said cutting speed responsive to the size of the cut parts (105) of said food product of vegetable origin.

15. The plant (1), according to claim 3, wherein said cutting means (53) is operated by a motor means (55), said cutting means (53) comprising a tubular portion (57) integral to at least one cutting blade (53), said tubular portion (57) mounted directly to a drive shaft (157) of said motor means (55) and comprised of a thrust bearing (59) mounted to said tubular portion (57).

16. The plant (1), according to claim 3, wherein said cutting means comprises:
   a movable cutting means;
   a fixed cutting means integral to a body of the cutting machine at an upstream position of said movable cutting means with respect to the conveying direction of said product in the machine same, said fixed cutting means having a profiled cutting edge arranged to provide a preliminary cut of said food product of vegetable origin before that it reaches the movable cutting means.

17. The plant (1), according to claim 1, wherein said treating machine is a softening machine arranged to soften the starting food product of vegetable origin through a plurality of pulses in quick succession obtaining a softened product.

18. The plant (1), according to claim 1, wherein said treating machine is a grinding machine arranged to grind said starting food product of vegetable origin.

19. The plant (1), according to claim 1, wherein said treating machine (20) is a chopping machine arranged to chop said starting food product of vegetable origin.

20. The plant (1), according to claim 1, wherein said treating machine (20) is a machine in which the product is caused to pass through a sieve.

21. The plant (1), according to claim 1, wherein said treating machine (20) is a machine in which a cut is obtained of the starting food product of vegetable origin.

22. A method for cold extraction of puree, or fruit juice, from a food product of vegetable origin that is fed at least partly frozen in a block, or cake, each block, or cake containing a plurality of single food product pieces, said method comprising the steps of:
prov018ing said food product at least partly frozen in a block, or cake, in bags, or barrels;
gripping each bag, or barrel (200), and bringing said bag, or barrel, (200) from a gripping height hp to a discharging height hs, with hs>hp, at which each said bag, or barrel (200) is tilted for introducing its content in a division machine (40) through a loading mouth (41);
dividing into a division machine said food product of vegetable origin frozen in a block, or cake into the division machine (40) in order to obtain parts of product having a predetermined size the division machine being equipped with division means (50') comprising a division roller (47) housed within a division chamber (45) having the loading mouth, the division roller (47) arranged to rotate about a rotation axis, and provided on an outer surface with a plurality of teeth (48) having a curved profile configured to penetrate at least partially in said block, or cake, of food product at least partly frozen;
treating the parts of product of predetermined size in order to obtain treated parts of food product;
carrying out a cold extraction of said treated parts of product, said cold extraction being obtained by a rotor that is configured to work in combination with a sieve having a plurality of holes, in order to separate said treated parts of product into a main product and into a waste material, wherein the main product, which comprises said puree, or juice, crosses said sieve and is discharged through a first outlet, whereas the waste material cannot cross said sieve and is discharged through a second outlet;
wherein a setting step is provided which is adapted to set a predetermined size of said parts, said predetermined size corresponding substantially to the original size of a single food product of said plurality contained in a block, or cake of frozen product; and wherein said division is arranged to divide said block, or cake, of food product at least partly frozen into a plurality of parts (105), each part of the plurality of parts having said predetermined size selected in said step of setting.

23. The plant (1), according to claim 1, wherein said division means is operatively connected to a setting means arranged to set a predetermined size of a single food product to obtain at the exit of the division machine.

24. The plant (1), according to claim 1, wherein said division means (50, 50') comprise a cutting means (53, 153) arranged to cut said food product (100) for dividing it into a predetermined number of parts (105) having said size set between 50 mm and 130 mm.

25. The plant (1), according to claim 1, wherein said division means (50, 50') comprise a cutting means (53, 153) arranged to cut said food product (100) for dividing it into a predetermined number of parts (105) having a size set between 80 mm and 110 mm.

26. The plant (1), according to claim 1, wherein said division means (50, 50') comprise a cutting means (53, 153) arranged to cut said food product (100) for dividing it into a predetermined number of parts (105) having a size set between 95 mm and 105 mm.

27. The plant (1), according to claim 1, wherein said treating machine (20) comprises:
a first feeding duct (23) arranged to connect said division machine (40, 40') with said treating machine (20);
at least a second feeding duct (24) of a food product arranged to connect the treating machine (20) with a device for loading a food product of vegetable origin that do not require to pass through the division machine (40) for a reduction of the size because already of the predetermined size;
a means for selectively connecting said first and said second feeding duct (23, 24) with said treating machine (20), in order to feed to said treating machine (20), respectively, parts of size set between 50 mm and 130 mm obtained by said division machine (40), or a food product of vegetable origin that is not frozen and that has a size already set between 50 mm and 130 mm.

28. The plant (1), according to claim 1, wherein a lifting conveyor means is provided arranged between said division machine (40) and said treating machine (20), said lifting conveyor means arranged to lift the parts of food product having the predetermined size obtained by said division machine, from a first height h1 to a second height h2 at which said parts of product are put in said treating machine (20).

29. The plant (1), according to claim 4, wherein said cutting means (53, 153) is a cutting machine (40') comprising:
a conveying means (156) operated by first motor means (56), said conveying means (156) is arranged to move said food product of vegetable origin (100) along a conveying direction (155) at a predetermined speed;
a cutting means (53) arranged along said conveying direction (155), said cutting means (53) being operated by a second motor means (55) in order to cut said food product of vegetable origin (100) into parts (105) of predetermined size at a predetermined cutting speed;
an adjustment means (300) of said first and of said seconds motor means (55, 56), said adjustment means (300) arranged to control said speed and said cutting speed responsive to the size of the cut parts (105) of said food product of vegetable origin.

30. The plant (1), according to claim 5, wherein said cutting means (53, 153) is a cutting machine (40') comprising:
a conveying means (156) operated by first motor means (56), said conveying means (156) is arranged to move said food product of vegetable origin (100) along a conveying direction (155) at a predetermined speed;
a cutting means (53) arranged along said conveying direction (155), said cutting means (53) being operated by a second motor means (55) in order to cut said food product of vegetable origin (100) into parts (105) of predetermined size at a predetermined cutting speed;
an adjustment means (300) of said first and of said seconds motor means (55, 56), said adjustment means (300) arranged to control said speed and said cutting speed responsive to the size of the cut parts (105) of said food product of vegetable origin.

31. The plant (1), according to claim 4, wherein said cutting means (53) is operated by a motor means (55), said cutting means (53) comprising a tubular portion (57) integral to at least one cutting blade (53), said tubular portion (57)

mounted directly to a drive shaft (157) of said motor means (55) and comprised of a thrust bearing (59) mounted to said tubular portion (57).

32. The plant (1), according to claim 5, wherein said cutting means (53) is operated by a motor means (55), said cutting means (53) comprising a tubular portion (57) integral to at least one cutting blade (53), said tubular portion (57) mounted directly to a drive shaft (157) of said motor means (55) and comprised of a thrust bearing (59) mounted to said tubular portion (57).

33. The plant (1), according to claim 1, wherein said treating machine is a softening machine arranged to soften the starting food product of vegetable origin through a plurality of pulses in quick succession obtaining a softened product.

34. The plant (1), according to claim 1, wherein said treating machine is a grinding machine arranged to grind said starting food product of vegetable origin.

35. The plant (1), according to claim 1 wherein said treating machine (20) is a chopping machine arranged to chop said starting food product of vegetable origin.

36. The plant (1), according to claim 1, wherein said treating machine (20) is a machine in which the product is caused to pass through a sieve.

37. The plant (1), according to claim 1, wherein said treating machine (20) is a machine in which a cut is obtained of the starting food product of vegetable origin.

\* \* \* \* \*